(12) United States Patent
Mease

(10) Patent No.: US 6,358,641 B1
(45) Date of Patent: Mar. 19, 2002

(54) TECHNIQUE AND ARRANGEMENT TO ALIGN FUEL CELL PLATES

(75) Inventor: Kevin L. Mease, Schenectady, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/378,772

(22) Filed: Aug. 20, 1999

(51) Int. Cl.[7] .............................................. H01M 2/00
(52) U.S. Cl. .................................................... 429/34
(58) Field of Search ..................................... 429/34–39

(56) References Cited

U.S. PATENT DOCUMENTS

| 3,589,941 A | * | 6/1971 | Eaton et al. |
| 4,397,917 A | | 8/1983 | Chi et al. |
| 4,416,955 A | | 11/1983 | Chi |
| 4,692,391 A | * | 9/1987 | Hirota |

* cited by examiner

Primary Examiner—Stephen Kalafut
Assistant Examiner—Susy Tsang
(74) Attorney, Agent, or Firm—Trop, Pruner & Hu, P.C.

(57) ABSTRACT

A fuel cell plate module includes fuel cell composite plates, a pin and a mechanism to hold the pin in place. The plates are arranged in a stack and include a first set of holes, and the pin extends at least partially through the first set of holes to align the plates. For example, a radial extension may extend from a shaft of the pin to secure the pin between an adjacent pair of the plates to hold the pin in place.

16 Claims, 3 Drawing Sheets

TECHNIQUE AND ARRANGEMENT TO ALIGN FUEL CELL PLATES

BACKGROUND

The invention relates to a method and apparatus for assembling a fuel cell stack.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions are described by the following equations:

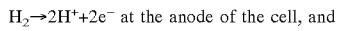
$H_2 \rightarrow 2H^+ + 2e^-$ at the anode of the cell, and

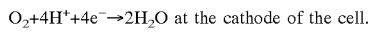
$O_2 + 4H^+ + 4e^- \rightarrow 2H_2O$ at the cathode of the cell.

Because a single fuel cell typically produces a relatively small voltage (around 1 volt, for example), several fuel cells may be formed out of an arrangement called a fuel cell stack to produce a higher voltage. The fuel cell stack may include different plates that are stacked one on top of the other in the appropriate order, and each plate may be associated with more than one fuel cell of the stack. The plates may be made from a graphite composite material or metal (as examples) and include various channels and orifices to, as examples, route the reactants and products through the fuel cell stack. Several PEMs (each one being associated with a particular fuel cell) may be dispersed throughout the stack between the anodes and cathodes of the different fuel cells. The PEM may be part of a membrane electrode assembly (MEA), an assembly in which the PEM is bonded to and between the anode and cathode. The anode and the cathode may be made out of a carbon cloth or paper material, for example.

Referring to FIG. 1, due to the large number (approximately 100, for example) of plates 6 in a fuel cell stack, the plates 6 may be assembled in substacks, called plate modules 5, so that the fuel cell stack may be formed and tested one plate module 5 at a time. In this manner, each plate module 5 may be assembled and leakage tests may be performed on the plate module 5 before the plate module 5 is stacked onto other plate modules 5 at a stack assembly press (not shown).

During the testing and assembling of a particular plate module 5, it is important that components (plates 6, MEAs, gas diffusion layers (GDLs), gaskets, etc.) of the plate module 5 do not separate or slide relative to each other. In this manner, sufficient relative movement of the plates 6 and other components of the plate module 5 may compromise the sealing and performance of the plate module 5 and compromise the overall ease of assembling the fuel cell stack 10.

To assemble a particular plate module 5, dielectric glass rods 9 may be inserted into holes 8 in a bottom assembly plate 3 (used for assembly purposes only) so that the rods 9 extend in an upward direction from the assembly plate 3. Next the composite plates 6 may be stacked on top of each other in the appropriate order by extending the rods 9 through alignment holes 7 that are formed in the plates 6. Following the assembly and leakage testing of the plate module 5, the rods 9 are removed from the plate module 5, and the plate module 5 is transported to the stack assembly press to be combined with other plate modules 5. If the rods 9 prematurely fall out of the plate module 5, relative sliding or separation of its plates 6 (or other components) may occur.

Referring to FIG. 2, at the stack assembly press, long vertically extending dielectric glass rods 11 are extended through the alignment holes 7 of the plate modules 5 to align the plate modules 5. When all of the plate modules 5 have been slid over the rods 11, the plates 6 of the stack 10 are compressed by a compression mechanism (not shown in FIG. 2). The rods 11 typically remain in the fuel cell stack 10 when the stack 10 is compressed to keep the plates 6 aligned. If the plates 6 experience sufficient relative movement side to side, the passageways that are provided by the alignment holes 7 may become blocked or reduced in size enough to prevent the plates 6 from freely sliding over the rods 11. As a result, the plates 6 may become attached to the rods 11 during compression of the stack 10, an attachment that may cause the plates 6 to shatter.

SUMMARY

In one embodiment of the invention, a fuel cell plate module includes fuel cell plates, a pin and a mechanism to hold the pin in place. The plates are arranged in a stack and include a first set of holes, and the pin extends at least partially through the first set of holes to align the plates.

In another embodiment, a fuel cell plate module includes fuel cell plates and a pin. The plates are arranged in a stack and include a first set of holes. A shaft of the pin extends through the first set of holes to align the plates. An extension of the pin radially extends from the shaft and is secured between an adjacent pair of the plates to hold the pin in place.

Advantages and other features of the invention will become apparent from the following description, from the drawing and from the claims.

DETAILED DESCRIPTION

Figure 1:
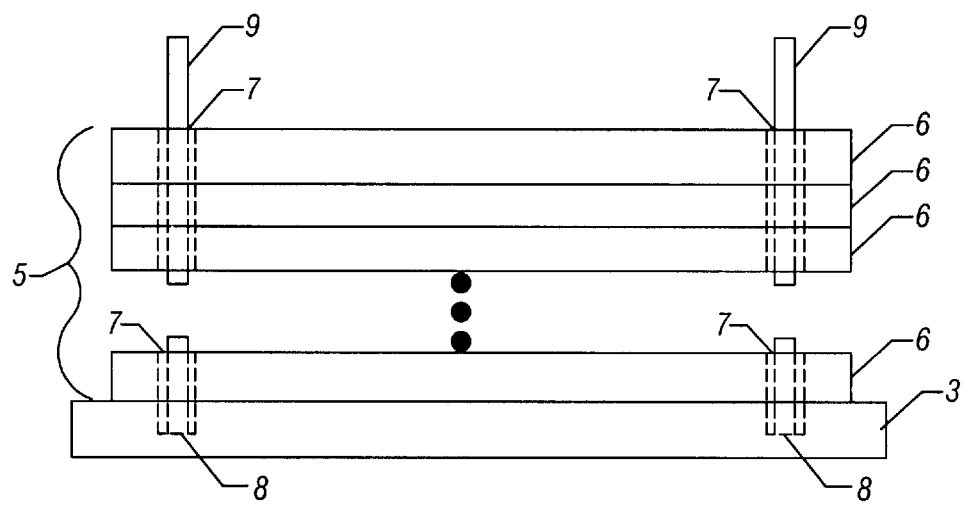
FIG. 1 is a schematic diagram of a fuel cell plate module of the prior art.
Figure 2:
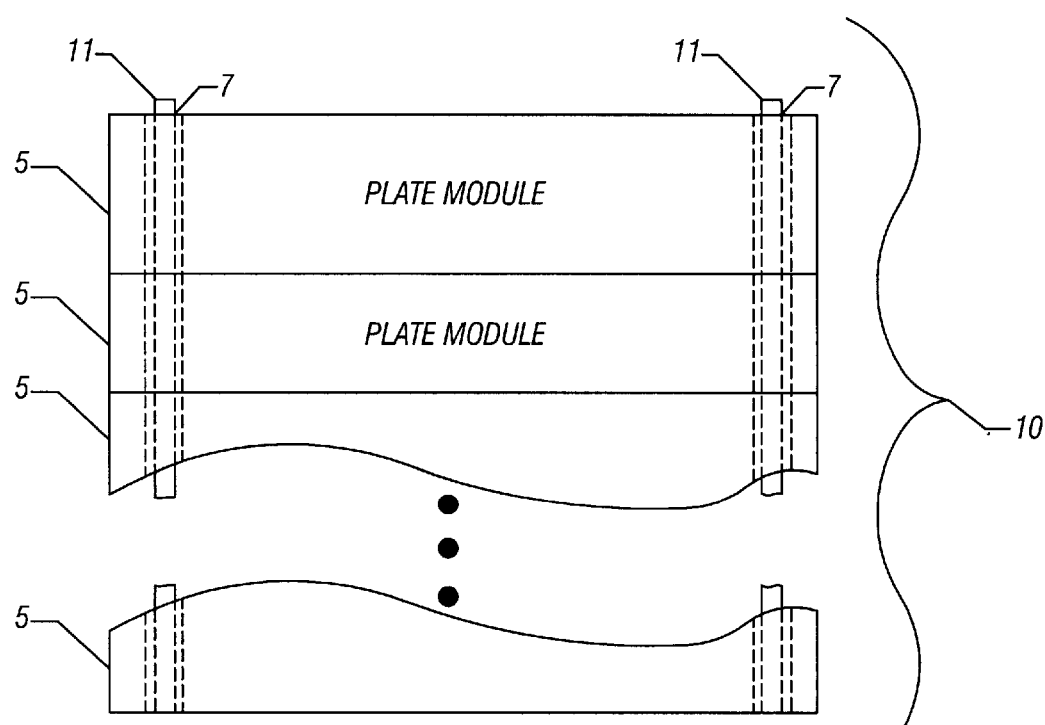
FIG. 2 is a schematic diagram of a fuel cell stack of the prior art.
Figure 3:
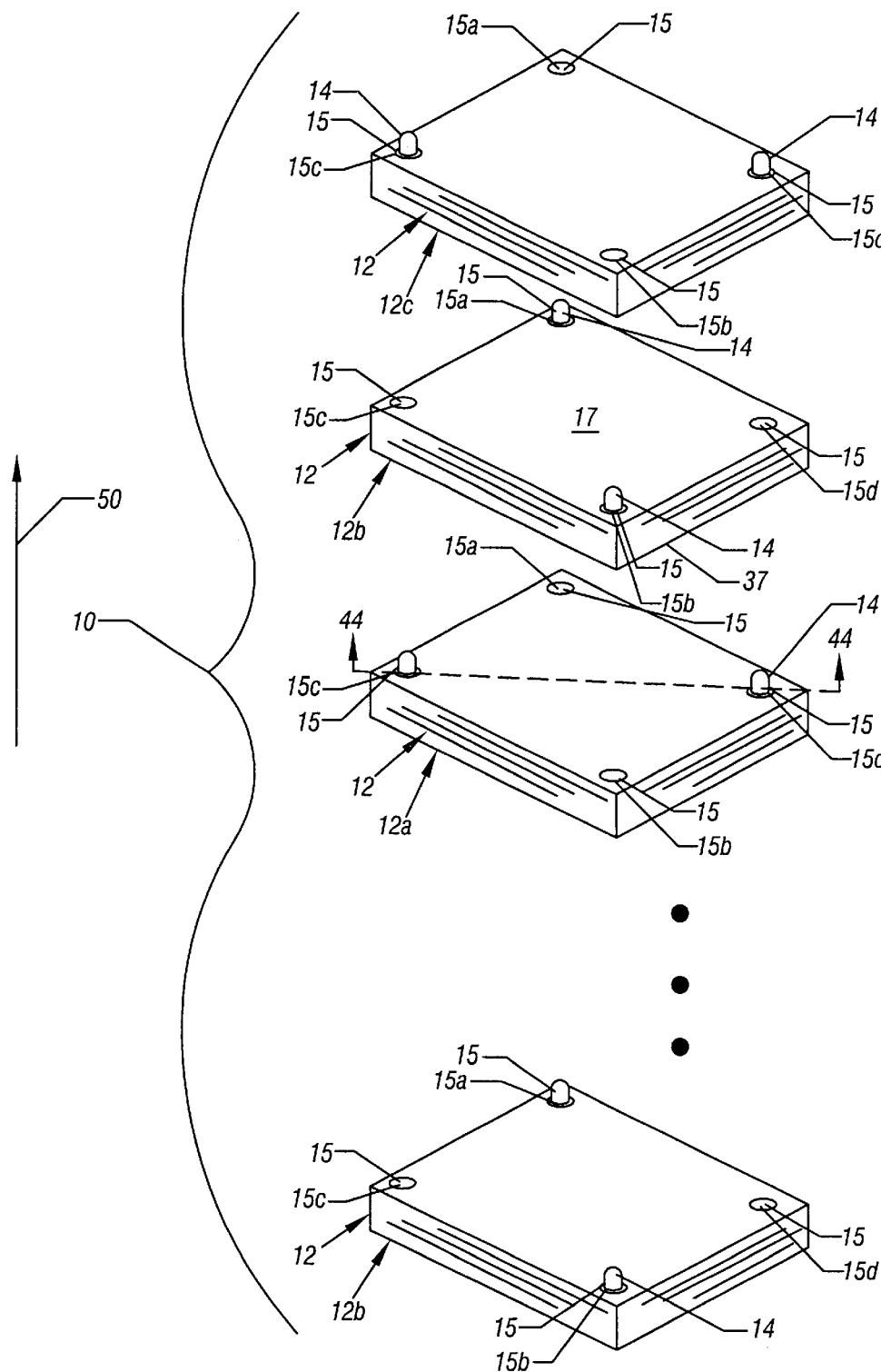
FIG. 3 is an exploded perspective view of a fuel cell stack according to an embodiment of the invention.

Referring to FIG. 3, an embodiment 10 of a fuel cell stack in accordance with the invention includes plate modules 12 (plate modules 12a, 12b and 12c, as examples) that may be stacked together to form the fuel cell stack 10. Each plate module 12 includes at least one alignment pin 14 that extends through alignment holes 15 (alignment holes 15a, 15b, 15c or 15d, as examples) to align plates of the plate module 12 together. The pin 14 has a mechanism (described below) to capture the pin 14 between the plates of the module 12. Therefore, due to this "self-capturing" feature of the pin 14, each plate module 12 may be leakage tested and assembled with other plate modules 12 (at a stack assembly press) to form the fuel stack 10 without removing the alignment pin(s) 14. Furthermore, as described below, the pins 14 may be used to align adjacent plate modules 12 together during the assembly of the stack 10. Thus, in some embodiments, the stack 10 does not use long glass rods to extend through and align the plates of the stack 10, but rather, the pins 14 may serve dual functions by aligning the plates 6 of the plate modules 12 and aligning adjacent plate modules 12.

Figure 4:
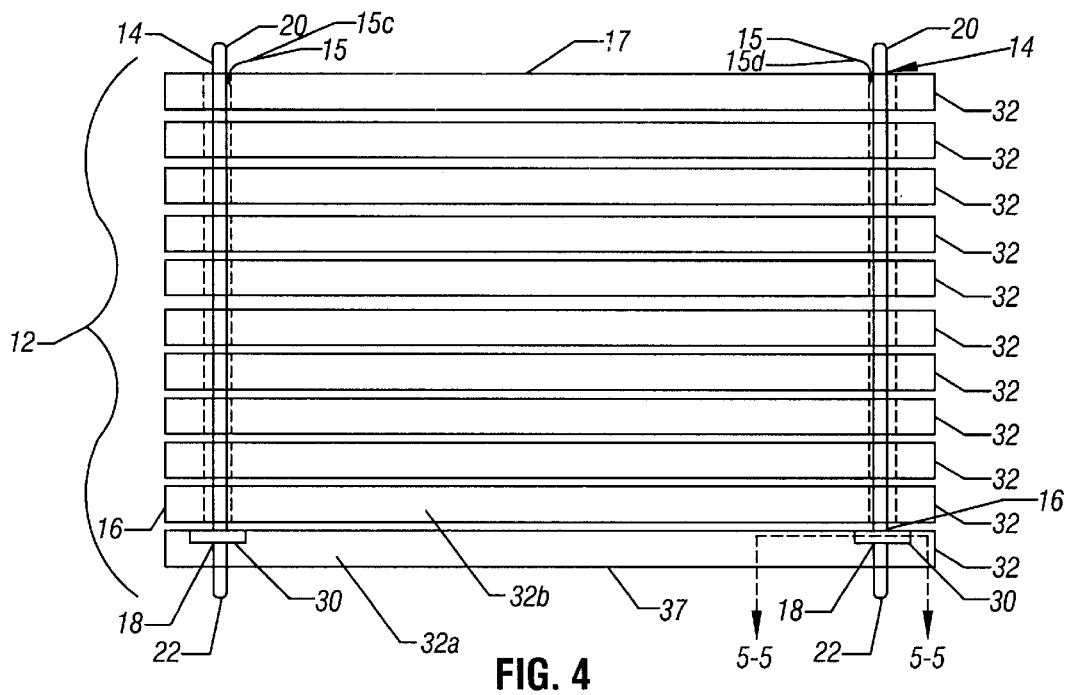
FIG. 4 is a cross-sectional view of a plate module of FIG. 3 taken along line 4—4 of FIG. 3.
Figure 5:
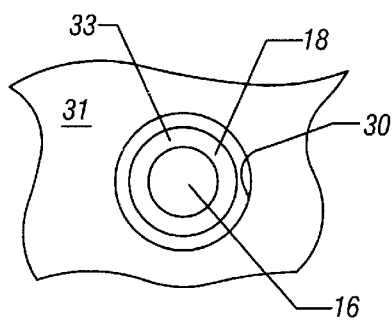
FIG. 5 is a cross-sectional view taken along line 5—5 of FIG. 4.
Figure 6:
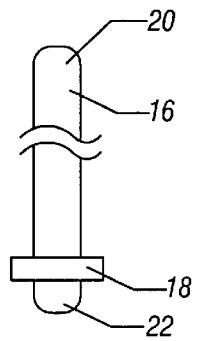
FIG. 6 is a side view of an alignment pin according to an embodiment of the invention.

More particularly, in some embodiments, the pin 14 may have a mechanism that is depicted in a cross-sectional view of an assembled plate module 12 in FIG. 4 and in a side view of the pin 14 that is depicted in FIG. 5. As shown, the plate module 12 may be formed from a substack of plates 32 (plates made from a graphite composite material, for example) that, in turn, may form several fuel cells. The pin 14 may include a shaft 16 that extends through the alignment holes 15 (see FIG. 3) of the plates 32 of the plate module 12 to align the plates 32 together. To prevent the pin 14 from slipping out of the plate module 12, the pin 14 may include an annular flange 18 that circumscribes the shaft 16. The flange 18, as depicted in more detail in FIG. 5, may reside in a circular depression, or seat 30, in one of the composite plates 32, such as a bottom plate 32a of the plate module 12. Thus, due to this arrangement, a surface 33 of the flange 18 may be substantially planar with an upper surface 31 of the plate 32a. Because travel of the flange 18 is confined between the bottom plates 32 and a plate 32b that is stacked on top of the bottom plate 32a, the pin 14 is prevented (once the plate 32b is in place) from falling out of the alignment holes 15 in either direction.

Thus, to assembly a particular plate module 12, initially the pin 14 may be placed in the seat 30 of the plate 32a. A bottom end 22 of the shaft 16 may rest in a hole of a bottom assembly plate (not shown) during assembly of the plate module 12. As depicted in FIG. 4, more than one pin 14 may be placed in other corresponding seat(s) 30 of the bottom plate 32a and extend through other alignment holes 15 of the composite plates 32. These pin(s) 14 may also be temporarily held by corresponding holes in the bottom assembly plate. After the pin(s) are seated in the plate 32a, the remaining plates 32 (such as the plate 32b, for example) are stacked on top of the plate 32a while allowing the shaft(s) 18 of the pin(s) 14 to slide through the alignment holes 15. The MEAs, gaskets and other components are inserted between appropriate plates 32. Thus, after assembly, the annular flange(s) 18 of the pin(s) 14 prevents the pin(s) 14 from falling out of the plate module 12 during transport and testing of the module 12.

In some embodiments, the pin 14 may be made out of a dielectric material that has a low coefficient of friction. For example, in some embodiments, the pin 14 may be made out of plastic. The low coefficient of friction, in turn, permits relatively free movement of the plates 32 over the pin(s) 14, a movement that may need to occur during leakage testing of the plate module 12 and during the compression of the plates 32 at the stack assembly press. Alternatively, the pin 14 may be made out of another material, such as glass, for example.

As a more specific example, in some embodiments, each plate module 12 may include twelve (for example) plates 32 that form eight (for example) fuel cells. As another example, the fuel cell stack 10 may be formed from approximately 11 to 13 plate modules 12. In other embodiments, fewer or more plate modules 12 may be used to form the fuel cell stack 10, and fewer or more plates 32 may form each plate module 12. Furthermore, in some embodiments, some plate modules 12 may have a different number of plates 32 than other plate modules 12. Other arrangements are possible.

As depicted in FIG. 3, in some embodiments, the plate module 12 may be generally flat and rectangular. The plate module 12 may have, for example, four alignment holes (alignment holes 15a, 15b, 15c and 15d shown as examples) that are located near the four corners of the plate module 12. In this manner, two pins 14 may extend through two diagonally-opposed holes 15 of each plate module 12 to permit the plate module 12 to mate with an adjacent plate module 12. For example, in some embodiments, the plate module 12b may be formed from plates 32 that have diagonally-opposed alignment holes 15a and 15b through which the shafts 18 of two different pins 14 extend. Because upper ends 20 (see FIG. 4) of the shafts 18 may extend beyond an upper face 17 of the plate module 12b, the upper ends 20 may mate with corresponding alignment holes 15a and 15b of a plate module 12c that is located directly above the plate module 12b. Similarly, lower ends 22 of the shafts 18 may extend beyond a bottom surface 37 of the plate module 12b into corresponding holes 15a, 15b of the plate module 12a that is located below the plate module 12b. In some embodiments, the ends 20 and 22 of the shafts 16 only partially extend into the plate modules 12c and 12a, respectively. As an example, the ends 20 and 22 may have rounded dome-shaped profiles to aid in guiding the pins 14 into the alignment holes 15.

In some embodiments, along the vertical direction of the stack 10, the pairs of pins 14 of each plate module 12 alternately extend between the pair 15a and 15b of diagonally opposed holes and the pair 15c and 15d of diagonally opposed holes. For example, the shafts of the alignment pins 14 in the plate module 12c extend through the diagonally-opposed holes 15c and 15d of the plate module 12c and partially extend into the holes 15c and 15d (of the plate module 12b) that do not include captured pins 14. Thus, in a sense, the fuel cell stack 10 includes two differently arranged plate modules 12: one plate module 12 (plate module 12b, for example) in which the captured alignment pins 14 extend through the holes 15a and 15b and other plate modules 12 (plate modules 12a and 12c, as examples) in which the captured alignment pins 14 extend through the holes 15c and 15d. The two different types of plate modules 12, in turn, are interleaved between each other along the vertical axis of the stack 10 (as depicted in FIG. 3).

It is noted that the vertical axis, as described above, is used for convenience of description and is not necessary to practice the invention. Thus, the fuel cell stack 10 may be stacked along an axis 50 (see FIG. 3) that is oriented in any direction, and references herein to such directional terms as up, upper, down, downward, etc. may be alternatively defined in reference to the axis 50 that may be oriented in any direction.

Other embodiments are within the scope of the claims. For example, the alignment pins 14 may be shorter or larger than that described above. As another example, the end (top or bottom) of a particular captured alignment pin 14 may extend substantially through the adjacent plate modules, as well as extend through several additional plate modules. Fewer or more pins may extend through the plate modules 12.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell plate module comprising:

fuel cell plates arranged in a stack and including a first set of holes; and a pin extending through the first set of holes to align the plates, the pin comprising a flange to radially extend between two of the plates and the plates capturing the pin to hold the pin in place.

2. The fuel cell plate module of claim 1, wherein the shaft includes a first end to extend through a first face of the stack and a second end adapted to extend through a second face of the stack.

3. The fuel cell plate module of claim 1, wherein the radial extension comprises a flange that circumscribes a shaft of the pin.

4. The fuel cell plate module of claim 3, wherein at least one of the plates includes a recessed region to hold the flange.

5. The fuel cell plate module of claim 2, wherein the first and second ends of the shaft are adapted to extend into holes of adjacent plate modules.

6. The fuel cell plate module of claim 2, wherein the first end of the shaft has a rounded profile.

7. A fuel cell plate module comprising:

fuel cell plates arranged in a stack and including a first set of holes; and a pin including a shaft extending through the first set of holes to align the plates and an extension radially extending from the shaft and being secured between an adjacent pair of the plates to hold the pin in place.

8. The fuel cell plate module of claim 7, wherein the plates further include a second set of holes, the fuel cell plate module further comprising:

another pin including a shaft extending through the second set of holes to align the plates and an extension radially extending from the shaft of said another pin and being secured between an adjacent pair of the plates to hold said another pin in place.

9. The fuel cell plate module of claim 8, wherein the adjacent pair of plates holding the first pin in place comprises the same adjacent pair of plates holding the second pin in place.

10. The fuel cell plate module of claim 7, wherein the radial extension comprises a flange that at least partially circumscribes the shaft.

11. The fuel cell plate module of claim 10, wherein at least one of the adjacent pair of plates includes a recessed region to hold the flange.

12. The fuel cell plate module of claim 7, wherein the pin is made from a plastic material.

13. A method comprising:

arranging fuel cell plates in a stack;

inserting a pin through holes of the plates to align the plates; and positioning a radial flange of the pin between two of the plates to hold the pin in place.

14. The method of claim 13, further comprising:

inserting another pin through other holes of the plates to align the plates; and positioning a radial flange of said another pin between two of the plates to hold said another pin in place.

15. The method of claim 13, comprising:

placing the flange in a recessed region of at least one of said two plates.

16. The method of claim 13, further comprising:

extending an end of the pin beyond a face of the stack to mate the stack with another stack.

* * * * *